(12) United States Patent
Dunjic et al.

(10) Patent No.: US 12,518,270 B2
(45) Date of Patent: Jan. 6, 2026

(54) METHOD AND SYSTEM FOR COMPLETING A DATA TRANSFER

(71) Applicant: The Toronto-Dominion Bank, Toronto (CA)

(72) Inventors: Milos Dunjic, Oakville (CA); David Samuel Tax, Toronto (CA); Vipul Kishore Lalka, Oakville (CA)

(73) Assignee: The Toronto-Dominion Bank, Toronto (CA)

( * ) Notice: Subject to any disclaimer, the term of this patent is extended or adjusted under 35 U.S.C. 154(b) by 407 days.

(21) Appl. No.: 17/095,024

(22) Filed: Nov. 11, 2020

(65) Prior Publication Data
US 2022/0147985 A1   May 12, 2022

(51) Int. Cl.
*G06Q 20/40* (2012.01)
*G06Q 20/04* (2012.01)
*G06Q 20/10* (2012.01)
*G06Q 20/38* (2012.01)
*G06Q 30/02* (2023.01)

(52) U.S. Cl.
CPC ....... *G06Q 20/3821* (2013.01); *G06Q 20/047* (2020.05); *G06Q 20/108* (2013.01); *G06Q 20/405* (2013.01); *G06Q 30/02* (2013.01)

(58) Field of Classification Search
CPC .................................................. G06Q 20/381
See application file for complete search history.

(56) References Cited

U.S. PATENT DOCUMENTS

| | | | |
|---|---|---|---|
| 7,395,241 B1 | 7/2008 | Cook et al. | |
| 7,540,408 B2 | 6/2009 | Levine et al. | |
| 7,644,037 B1 | 1/2010 | Ostrovsky | |
| 8,738,520 B2 | 5/2014 | Runkle et al. | |
| 10,489,753 B2 | 11/2019 | Allen-Rouman et al. | |
| 2007/0244811 A1* | 10/2007 | Tumminaro | G06Q 20/3274 705/39 |
| 2009/0106152 A1 | 4/2009 | Dill et al. | |
| 2013/0060689 A1 | 3/2013 | Oskolkov et al. | |

(Continued)

*Primary Examiner* — Arunava Chakravarti
(74) *Attorney, Agent, or Firm* — Rowand LLP

(57) ABSTRACT

A server comprises a communications module; a processor coupled with the communications module; and a memory coupled to the processor and storing processor-executable instructions which, when executed by the processor, configure the processor to receive, via the communications module and from a first computing device, a signal representing a data transfer request, the data transfer request including at least a transfer amount and a transfer address; send, via the communications module and to the transfer address, a signal including an electronic message, the electronic message including the transfer amount and at least one selectable option defining a transfer method, the at least one selectable option including a first selectable option defining a first transfer method that includes an additional requirement not required by a second transfer method; receive, via the communications module and from a second computing device, a signal indicating a selection of the at first selectable option defining the first transfer method; determine that the additional requirement has been completed; and when it is determined that the additional requirement has been completed, complete the data transfer using the first transfer method.

18 Claims, 9 Drawing Sheets

(56) References Cited

U.S. PATENT DOCUMENTS

| | | | |
|---|---|---|---|
| 2014/0129429 A1* | 5/2014 | LeCuyer | G06Q 20/26 |
| | | | 705/39 |
| 2014/0156512 A1* | 6/2014 | Rahman | G06Q 20/326 |
| | | | 705/39 |
| 2014/0201075 A1 | 7/2014 | King et al. | |

* cited by examiner

METHOD AND SYSTEM FOR COMPLETING A DATA TRANSFER

TECHNICAL FIELD

The present application relates to methods and systems for completing a data transfer.

BACKGROUND

Typically, transfers of data are initiated by a transferor who has control over how the transfer of data is executed. As a result, the transferor may select a transfer protocol or transfer method which may not be acceptable to the transferee.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
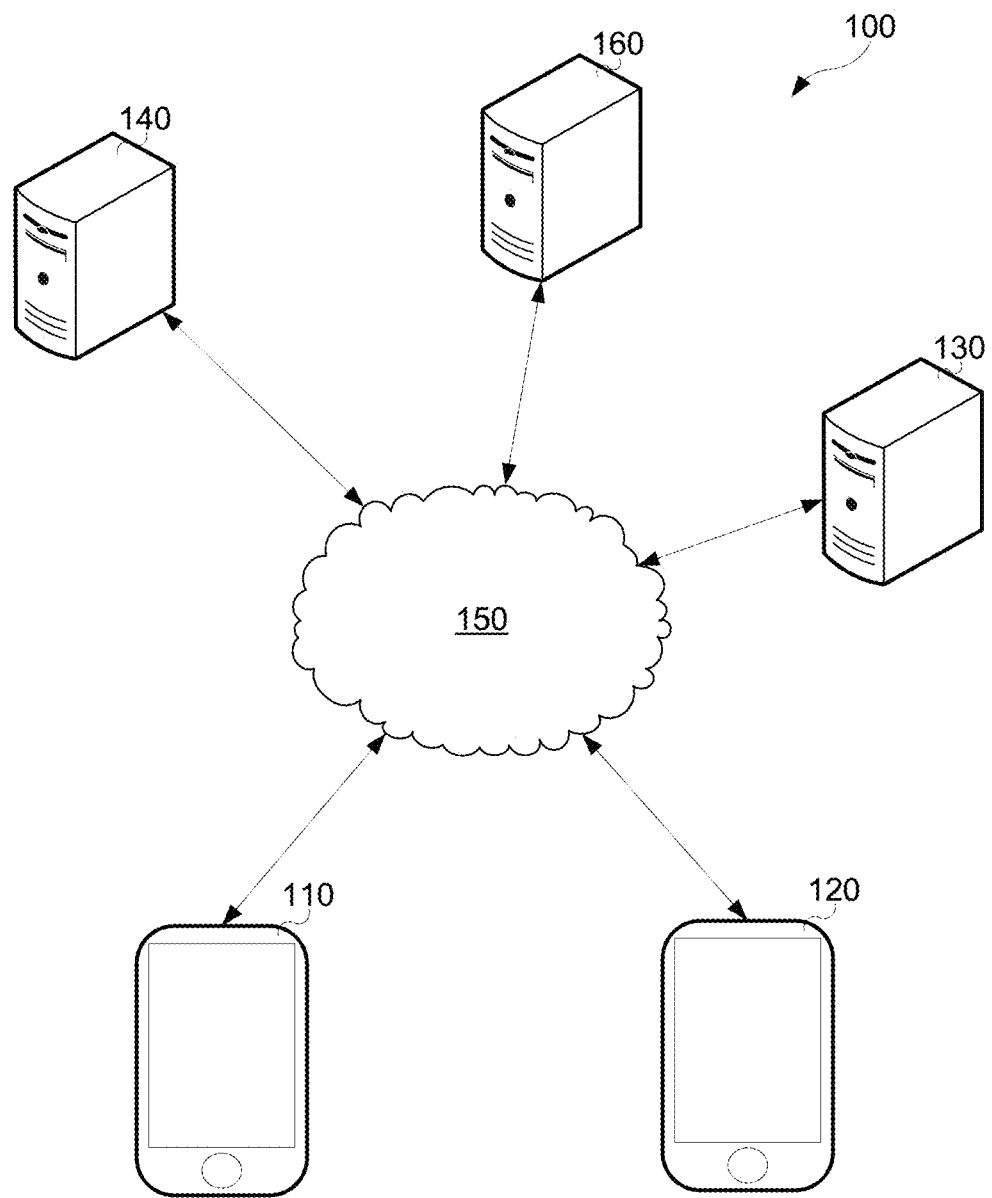
FIG. 1 is a schematic operation diagram illustrating an operating environment of an example embodiment.

Accordingly, in one aspect there is provided a server comprising a communications module; a processor coupled with the communications module; and a memory coupled to the processor and storing processor-executable instructions which, when executed by the processor, configure the processor to receive, via the communications module and from a first computing device, a signal representing a data transfer request, the data transfer request including at least a transfer amount and a transfer address; send, via the communications module and to the transfer address, a signal including an electronic message, the electronic message including the transfer amount and at least one selectable option defining a transfer method, the at least one selectable option including a first selectable option defining a first transfer method that includes an additional requirement not required by a second transfer method; receive, via the communications module and from a second computing device, a signal indicating a selection of the first selectable option defining the first transfer method; determine that the additional requirement has been completed; and when it is determined that the additional requirement has been completed, complete the data transfer using the first transfer method.

In one or more embodiments, the first transfer method requires an input-output modifier for completing the transfer using the first transfer method and wherein the additional requirement, when completed, eliminates or reduces the input-output modifier for completing the transfer using the first transfer method.

In one or more embodiments, the additional requirement includes at least one of an input-output modifier; completion of a survey; providing account information via an application programming interface (API); or verifying identity data via a digital identity network.

In one or more embodiments, the additional requirement includes the input-output modifier and completing the transfer using the first transfer method includes applying the input-output modifier to the transfer amount.

In one or more embodiments, the additional requirement includes verifying identity data via the digital identity network and the processor-executable instructions, when executed by the processor, further configure the processor to receive, via the communication module and from the digital identity network, a signal including the requested identity data.

In one or more embodiments, the requested identity data includes account information.

In one or more embodiments, the additional requirement includes providing account information via the API and the processor-executable instructions, when executed by the processor, further configure the processor to receive, via the communications module and from a server, a signal including the account information.

In one or more embodiments, the account information includes at least one of a bank account balance, a transaction history, identity information, bank account information or account age data.

In one or more embodiments, the additional requirement includes completion of the survey and wherein determining that the additional requirement has been completed includes receiving, via the communications module, a signal indicating that the survey has been completed.

In one or more embodiments, the electronic message includes a first transfer time for completing the first transfer method and a second transfer time for completing the second transfer method, the first transfer time less than the second transfer time.

In one or more embodiments, the first transfer method includes completing the transfer using real-time payment rails.

According to another aspect there is provided a computer-implemented method comprising receiving, via a communications module and from a first computing device, a signal representing a data transfer request, the data transfer request including at least a transfer amount and a transfer address; sending, via the communications module and to the transfer address, a signal including an electronic message, the electronic message including the transfer amount and at least one selectable option defining a transfer method, the at least one selectable option including a first selectable option defining a first transfer method that includes an additional requirement not required by a second transfer method; receiving, via the communications module and from a second computing device, a signal indicating a selection of the first selectable option defining the first transfer method;

determining that the additional requirement has been completed; and when it is determined that the additional requirement has been completed, completing the transfer using the first transfer method.

In one or more embodiments, the first transfer method requires an input-output modifier for completing the transfer using the first transfer method and wherein the additional requirement, when completed, eliminates or reduces the input-output modifier for completing the transfer using the first transfer method.

In one or more embodiments, the additional requirement includes at least one of an input-output modifier; completion of a survey; providing account information via an application programming interface (API); or verifying identity data via a digital identity network.

In one or more embodiments, the additional requirement includes the input-output modifier and completing the transfer using the first transfer method includes applying the input-output modifier to the transfer amount.

In one or more embodiments, the additional requirement includes verifying identity data via the digital identity network and the method further comprises receiving, via the communication module and from the digital identity network, a signal including the requested identity data.

In one or more embodiments, the additional requirement includes providing account information via the API and the method further comprises receiving, via the communications module and from a server, a signal including the account information.

In one or more embodiments, the account information includes at least one of a bank account balance, a transaction history, identity information, bank account information or account age data.

In one or more embodiments, the electronic message includes a first transfer time for completing the first transfer method and a second transfer time for completing the second transfer method, the first transfer time less than the second transfer time.

According to another aspect there is provided a non-transitory computer readable storage medium comprising computer-executable instructions which, when executed, configure a processor to receive, via a communications module and from a first computing device, a signal representing a data transfer request, the data transfer request including at least a transfer amount and a transfer address; send, via the communications module and to the transfer address, a signal including an electronic message, the electronic message including the transfer amount and at least one selectable option defining a transfer method, the at least one selectable option including a first selectable option defining a first transfer method that includes an additional requirement not required by a second transfer method; receive, via the communications module and from a second computing device, a signal indicating a selection of the at first selectable option defining the first transfer method; determine that the additional requirement has been completed; and when it is determined that the additional requirement has been completed, complete the data transfer using the first transfer method.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a block diagram illustrating an operating environment of an example embodiment. Various components cooperate to provide a system 100 which may be used, for example, to perform an operation. As shown, the system 100 includes a computing device 110, a computing device 120, a server 130 and a digital identity network server 140 coupled to one another through a network 150, which may include a public network such as the Internet and/or a private network.

The server 130 is a financial institution server which may maintain customer bank accounts. That is, the server 130 may maintain a database that includes various data records. A data record may, for example, reflect an amount of value stored in a particular account associated with a user.

The computing device 110 and the computing device 120 may take a variety of forms such as a smartphone, a tablet computer, a wearable computer such as a head-mounted display or smartwatch, a laptop or desktop computer, or a computing device of another type. The computing device 110 may be referred to as a first computing device 110 and the computing device 120 may be referred to as a second computing device 120. The first computing device 110 may be used to send a data transfer request and the second computing device 120 may be used to accept a transfer. In certain embodiments, the first computing device 110 may be adapted to present a graphical user interface that allows for communication with the server 130. For example, the first computing device 110 may be adapted to send, to the server 130, a signal representing a data transfer request that includes at least a transfer amount and a transfer address. The second computing device 120 may be adapted to present an electronic message received from the server 130 that includes the transfer amount and at least one selectable option defining a transfer method. The second computing device 120 may be adapted to send, to the server 130, a signal indicating selection of the at least one selectable option.

The digital identity network server 140 is a server associated with a digital identity network. Although the digital identity network server 140 is illustrated as a single block, it may be a network consisting of numerous computer systems. For example, the digital identity network may be a blockchain network which includes a number of nodes. The blockchain network is a decentralized peer-to-peer network in which nodes may maintain respective copies of an append-only ledger.

The blockchain network may be a permissioned blockchain network in which only authorized nodes are permitted to add blocks to the blockchain. For example, only verified nodes may be granted permission to write to the blockchain. The verified nodes may be trusted nodes such as nodes associated with government organizations or other trusted entities such as banks. By way of example, the verified nodes may be associated with a driver's license bureau, a credit bureau, a government identity issuing office such as an entity registry office, or an office of another type. Given ones of these nodes may maintain identity records of various types. For example, a node associated with a passport office may maintain digital passport records, a node associated with a driver's license bureau may maintain digital licensing records, a node associated with a credit bureau may maintain digital credit records, and a node associated with a bank may maintain digital banking records. Various verified nodes may maintain contact information records which may, for example, specify an email address, postal address, telephone number, or other types of contact information.

Accordingly, at least some verified nodes may write to the blockchain. At least some of the blocks written to the blockchain may be related to verified identity data. The digital identity network server 140 may store verified identity data associated with a plurality of users. In at least some embodiments, verified identity data may not be included in the blockchain. Instead, the blocks may store a private secret that is related to such verified identity data. The private secret may act as proof to the existence of the verified identity data and may be used to verify the authenticity of the verified identity data. For example, in at least some embodiments, the private secret may be a hash of the verified identity data such that, when the verified identity data is provided to another system (i.e., a system apart from the verified node maintaining the identity data), it may be verified from the hash stored in a block on the blockchain.

The blockchain network may, for example, be implemented using Hyperledger Fabric, for example. It will, however, be appreciated that the blockchain network may take other forms.

Within the digital identity network, of which the digital identity network server 140 is associated, trusted partners may act as digital asset providers and digital asset consumers. In actions as a digital asset provider, a trusted member of the digital identity network may provide information about a particular user or customer to another trusted member of the digital identity network (e.g. a digital asset consumer). The requested information may be provided through the digital identity network via the digital identity network server 140 in a blind manner such that the digital asset provider does not know the identity of the digital asset consumer and such that the digital asset consumer does not know the identity of the digital asset provider.

The network 150 is a computer network. In some embodiments, the network 150 may be an internetwork such as may be formed of one or more interconnected computer networks. For example, the network 150 may be or may include an Ethernet network, an asynchronous transfer mode (ATM) network, a wireless network, a telecommunications network, or the like.

The system 100 also includes at least one third party server 160. A third party server 160 may be, for example, an application server associated with a third-party application (such as a web or mobile application) that is resident on the first computing device 110 or the second computing device 120 and/or an API. For example, the application server may connect the first computing device 110 and/or the second computing device 120 to a back-end system associated with the third-party application. The third party server 160 may be associated with an API that is configured to obtain account information for one or more accounts of a user. For example, the third party server 160 may store a token providing access to account information of a user stored on a financial institution server.

In at least some embodiments, a third party server 160 may be a financial institution server that is associated with a different financial institution than the server 130 and may similarly maintain customer bank accounts. That is, the server 160 may maintain a database that includes various data records. A data record may, for example, reflect an amount of value stored in a particular account associated with a user.

In at least some embodiments, a third party server 160 may be a transfer rail server configured to process a transfer of value from a first data record to a second data record. The first data record may be a data record maintained by the server 130 and the second data record may be a data record maintained by a server associated with a different financial institution than the server 130. The transfer rail server may be a real-time transfer rail server and may be configured to process the transfer in real-time or near real-time.

The first computing device 110, the second computing device 120, the server 130, the digital identity network server 140 and the third party server 160 may be in geographically disparate locations. Put differently, the first computing device 110, the second computing device 120, the server 130, the digital identity network server 140 and the third party server 160 may be remote from one another.

FIG. 1 illustrates an example representation of components of the system 100. The system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
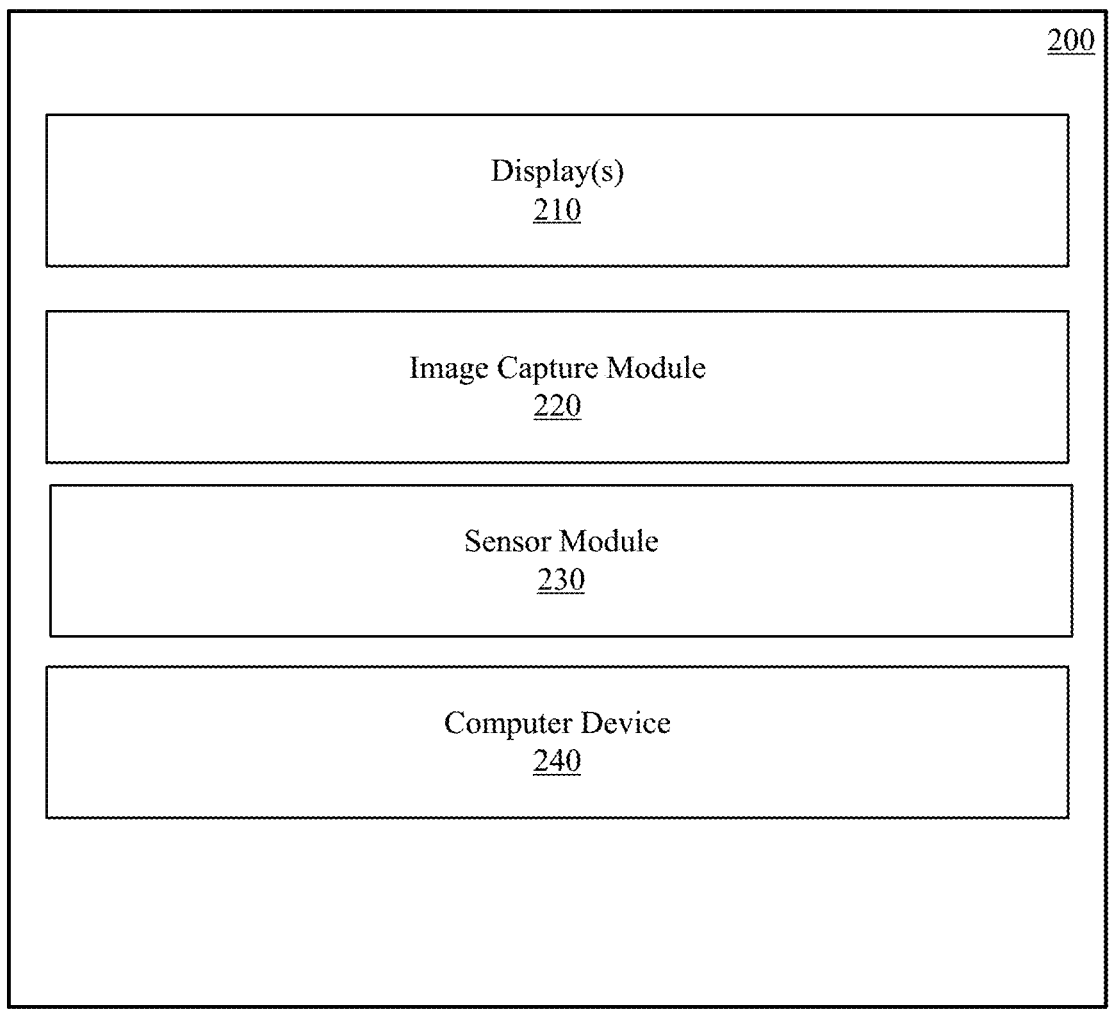
FIG. 2 is a simplified schematic diagram showing components of a computing device.

FIG. 2 is a simplified schematic diagram showing component of an exemplary computing device 200. The first computing device 110 and the second computing device 120 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server 130 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
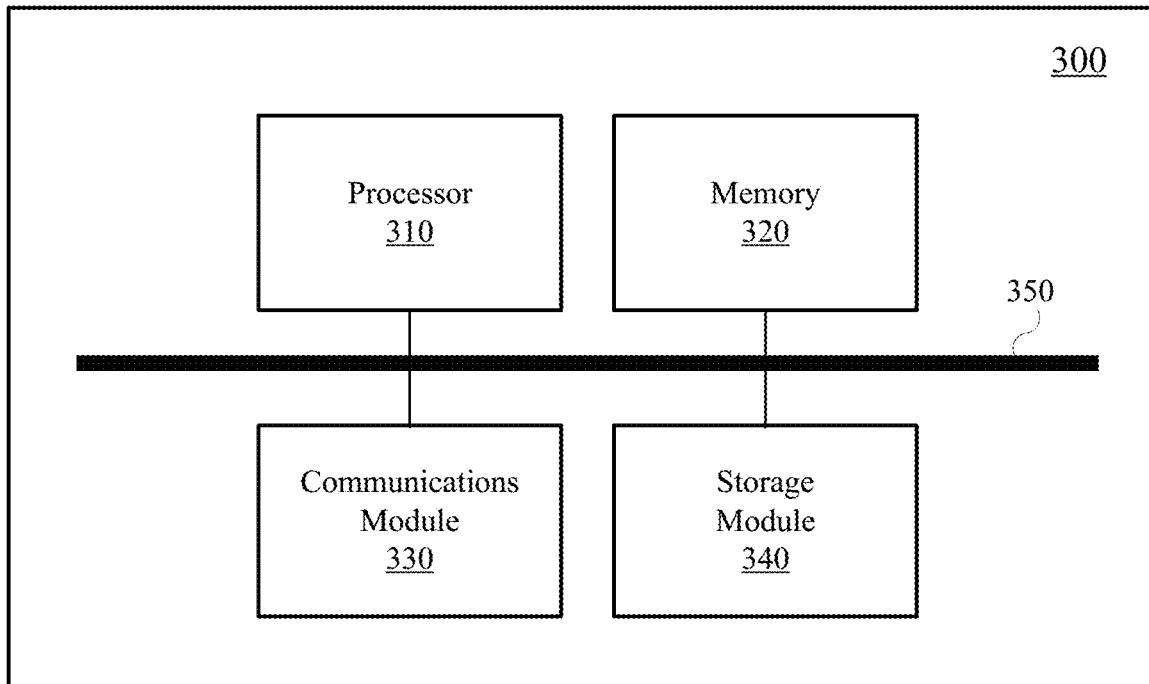
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the server 130, the digital identity network server 140 (or a node of the digital identity network) and/or the third party server 160.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
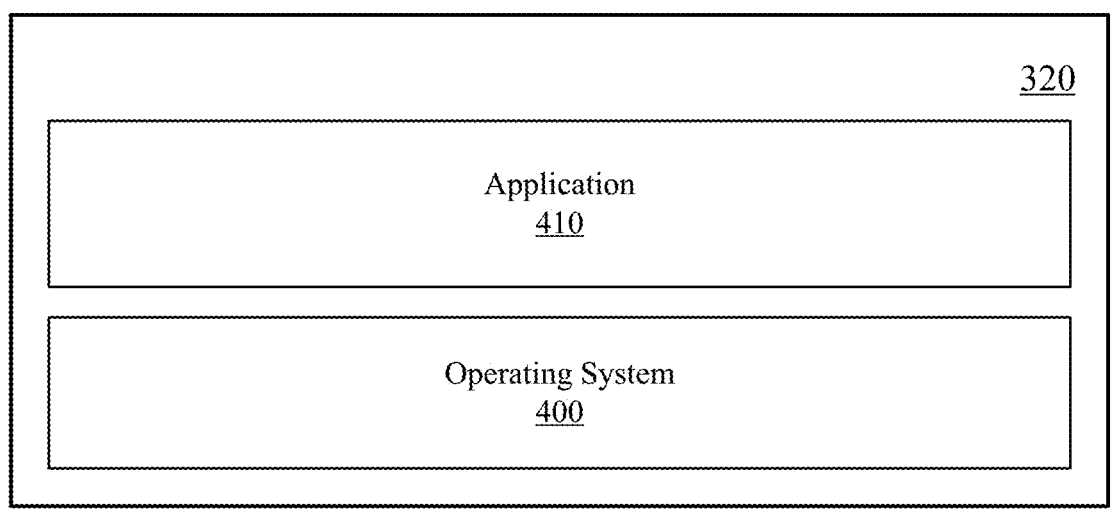
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2), the server 130, the digital identity network server 140 (or a node of the digital identity network), and/or the third party server 160.

While a single application 410 is illustrated in FIG. 3, in operation the memory 320 may include more than one application 410 and different applications 410 may perform different operations. For example, in at least some embodiments in which the computer device 300 is functioning as the first computing device 110 and/or the second computing device 120, the applications 410 may include a banking application. The banking application may be configured for secure communications with the server 130 and may provide various banking functions such as, for example, the ability to display a quantum of value in one or more data records (e.g. display balances), configure or request that operations such as transfers of value (e.g. bill payments, email money transfers and other transfers) be performed, and other account management functions.

By way of further example, in at least some embodiments in which the computer device 300 functions as the first computing device 110 and/or the second computing device 120, the applications 410 may include a web browser, which may also be referred to as an Internet browser. In at least some such embodiments, the server 130 may be a web server that may serve one or more of the interfaces described herein. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more data records (e.g. display balances), configure or request that operations such as transfers of value (e.g. bill payments and other transfers) be performed, and other account management functions.

By way of further example, in at least some embodiments in which the computer device 300 functions as the first computing device 110 and/or the second computing device 120, the applications 410 may include an electronic messaging application. The electronic messaging application may be configured to display a received electronic message such as an email message, short messaging service (SMS) message, or a message of another type. In at least some embodiments, the server 130 or digital identity network server 140 may be configured, through computer-executable instructions, to send an electronic message to the first computing device 110 and/or the second computing device 120. For example, the server 130 may be configured to send a SMS message to a phone number associated with a user and an electronic messaging application on the first computing device 110 or second computing device 120 may be configured to retrieve the message and display the message to the user. As another example, the server 130 may be configured to send an email message to an email address associated with a user and an email application on the first computing device 110 or second computing device 120 may be configured to retrieve the message and display the message to the user.

The server 130 is configured to receive and complete data transfer requests. A transfer may be a transfer of value from a first account to a second account. The server 130 is configured to complete received data transfer requests according to one or more transfer methods. For example, a first transfer method may utilize a real-time transfer rail server configured to process the transfer in a first transfer time which may be real-time or near real-time. The first transfer method may require an input-output modifier to complete the data transfer. The input-output modifier may be, for example, a set fee or may be a percentage of the transfer amount. As will be described in more detail below, the server 130 may present the user with one or more requirements that can be completed to reduce or eliminate the input-output modifier. A second transfer method may utilize a transfer rail server configured to process the transfer in a second transfer time that is longer than the first transfer time. The second transfer method may not require an input-output modifier. Additional transfer methods may also be used. The server 130 may present the receiver of the transfer with one or more selectable options to define a transfer method. When the server 130 receives a signal indicating selection of the transfer method, the server 130 may complete the data transfer using the selected transfer method.

A user may open the mobile banking application or the web browser on the first computing device 110 to initiate a data transfer request. The user may utilize a graphical user interface (GUI) displayed on the first computing device 110 to communicate with the server 130. The GUI may include one or more input fields for entering a transfer amount and a transfer address. The data transfer request may be an e-transfer request and as such the transfer address may be an email address or a mobile phone number. The e-transfer request may require a security question and as such the GUI may include an input field for entering a security question and an input field for entering a security answer. The GUI may include a selectable option to submit the data transfer request. When the user has completed the input fields, the user may select the selectable option to submit the data transfer request. In response, the first computing device 110 may send a signal causing the server 130 to perform operations to complete the data transfer request.

Figure 5:
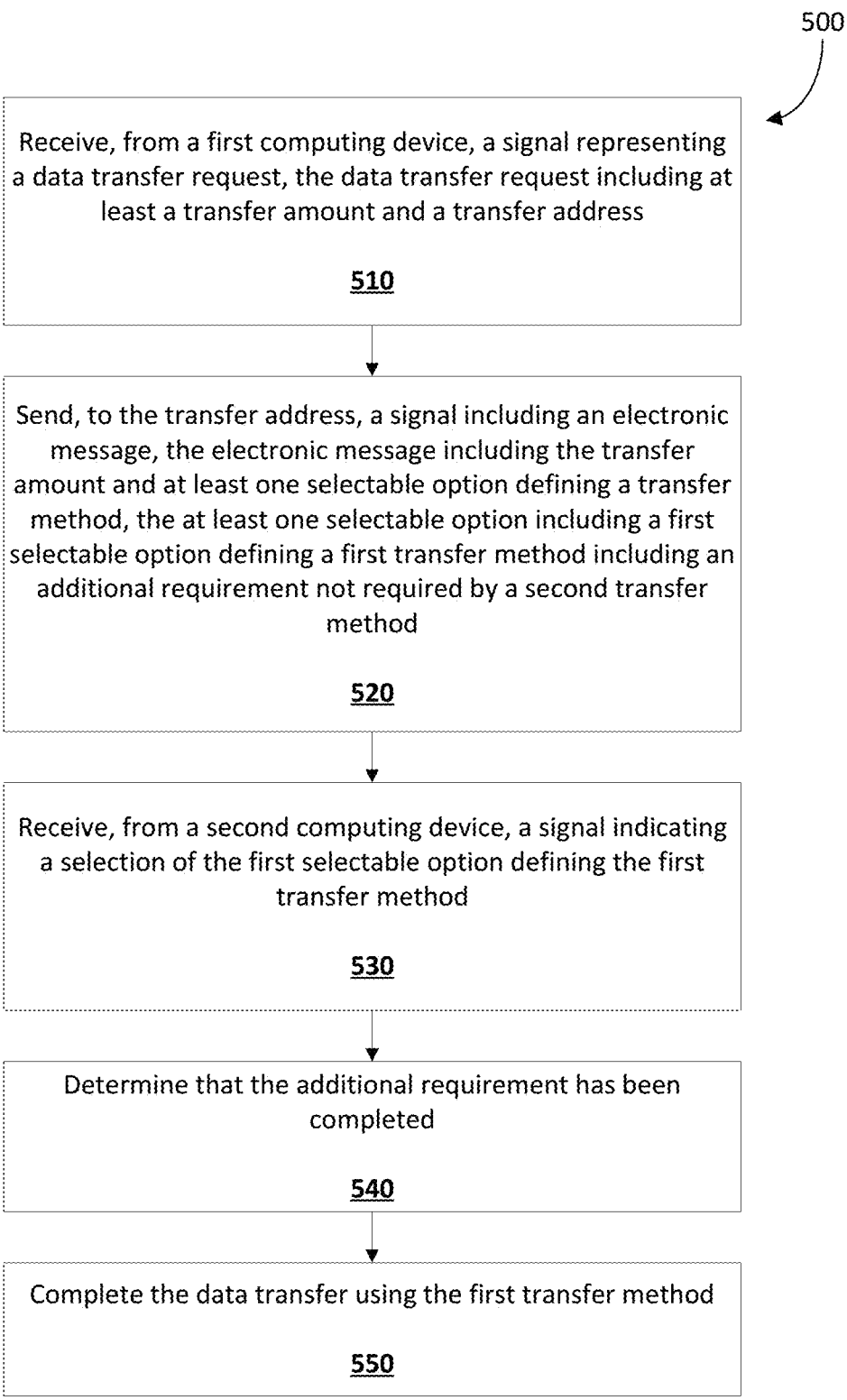
FIG. 5 is flowchart showing operations performed by a server in completing a data transfer according to an embodiment.

FIG. 5 is a flowchart showing operations performed by the server 130 in completing a data transfer according to an embodiment. The operations may be included in a method 500 which may be performed by the server 130. For example, computer-executable instructions stored in memory of the server 130 may, when executed by one or more processors, configure the server 130 to perform the method 500 or a portion thereof.

The server 130 receives, via the communications module and from the first computing device 110, a signal representing a data transfer request, the data transfer request including at least a transfer amount and a transfer address (step 510). As mentioned, in this embodiment, the data transfer request may be an e-transfer request and as such the transfer address may be an email address or a mobile phone number. In embodiments where a question and answer are required, the data transfer request may include the security question and the security answer.

The server 130 sends, via the communications module and to the transfer address, a signal including an electronic message, the electronic message including the transfer amount and at least one selectable option defining a transfer method, the at least one selectable option including a first selectable option defining a first transfer method including an additional requirement not required by a second transfer method (step 520).

The message may be retrieved by the second computing device 120. When the transfer address is an email address, the electronic message may be sent to the transfer address as an email message. A user may retrieve the message using an email application executing on the second computing device 120. Put another way, an email application executing on the second computing device 120 may be configured to retrieve the message and display the message on a display screen of the second computing device 120. Where the transfer address is a mobile phone number, the electronic message may be sent to the transfer address as a text or SMS message. A user may view the text or SMS message using an electronic messaging application executing on the second computing device 120. Put another way, an electronic messaging application executing on the second computing device 120 may be configured to retrieve the message and display the message on a display screen of the second computing device 120. The email, text or SMS message may include a hyperlink that, when selected, may cause the second computing device 120 to open a webpage or a mobile application to display the electronic message.

Figure 6:
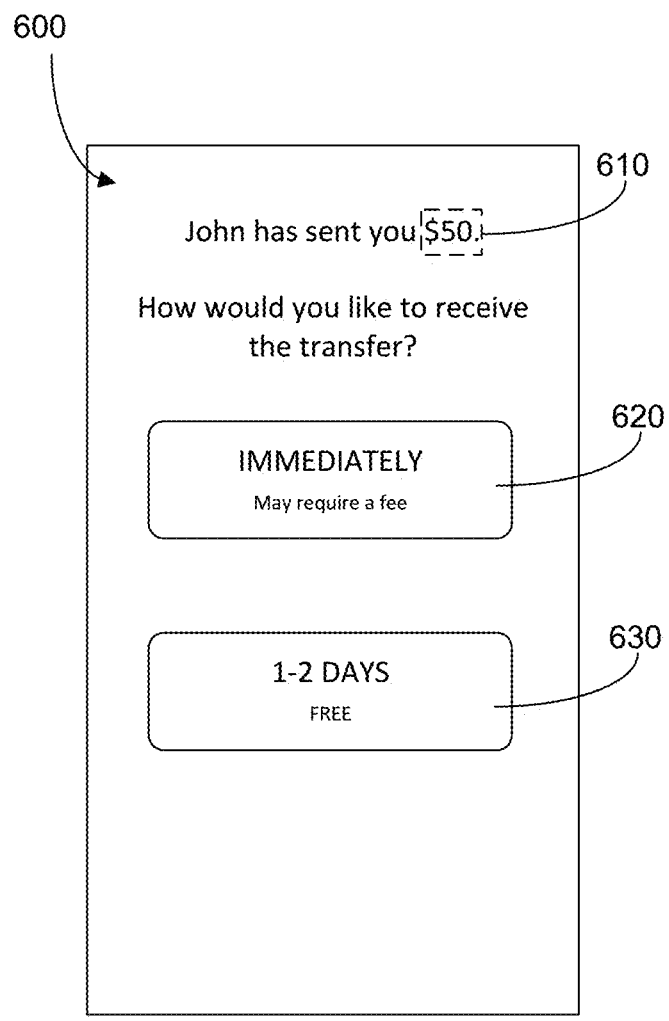
FIG. 6 is an example electronic message according to an embodiment.

As example electronic message 600 is shown in FIG. 6. The electronic message displays information relating to the transfer including the name of the sender and the transfer amount 610. The electronic message also includes a first selectable option 620 defining a first transfer method and a second selectable option 630 defining a second transfer method.

As mentioned, the first transfer method may utilize a real-time transfer rail server configured to process the transfer in a first transfer time which may be real-time or near real-time. The first selectable option 620 includes text "Immediately" indicating to the user that, should they select the first selectable option 620, the transfer may be processed in real-time or near real-time. The first transfer method may require an input-output modifier to complete the data transfer. The input-output modifier may be, for example, a set fee or may be a percentage of the transfer amount. As such, the first selectable option 620 includes text "May require a fee" indicating to the user that, should they select the first selectable option 620, they may be required to pay a fee. When the user selects the first selectable option 620, the second computing device 120 sends a signal to the server 130 indicating selection of the first selectable option 620 defining the first transfer method and the method 500 continues to step 530.

The second transfer method may utilize a transfer rail server configured to process the transfer in a second transfer time that is longer than the first transfer time. The second selectable option 630 includes text "1-2 Days" indicating to the user that, should they select the second selectable option 630, the transfer may be processed in one or two business days. The second transfer method does not require an input-output modifier and does not require any other requirements to complete the data transfer. As such, the second selectable option 630 includes text "Free" indicating to the user that, should they select the second selectable option 630, they are not required to pay a fee. When the user selects the second selectable option 630, the second computing device 120 sends a signal to the server 130 indicating selection of the second selectable option 630 defining the second transfer method and the method completes the transfer using the second transfer method, as will be described in more detail.

As mentioned, during step 520, when the user selects the first selectable option 620, the second computing device 120 sends a signal to the server 130 indicating selection of the first selectable option 620 defining the first transfer method. The server 130 then receives, via the communications module and from the second computing device 120, the signal indicating a selection of the first selectable option defining the first transfer method (step 530).

In this embodiment, the first transfer method requires an input-output modifier such as for example a fee. In response to receiving the signal indicating selection of the first selectable option 620, the server 130 sends a signal including an electronic message that includes one or more selectable options for requirements to be completed to reduce or eliminate the input-output modifier. The requirements may be, for example, tasks to be completed by the user. In this embodiment, the requirements include the input-output modifier, completion of a survey, providing account information via an application programming interface, or verifying identity data via a digital identity network.

Figure 7:
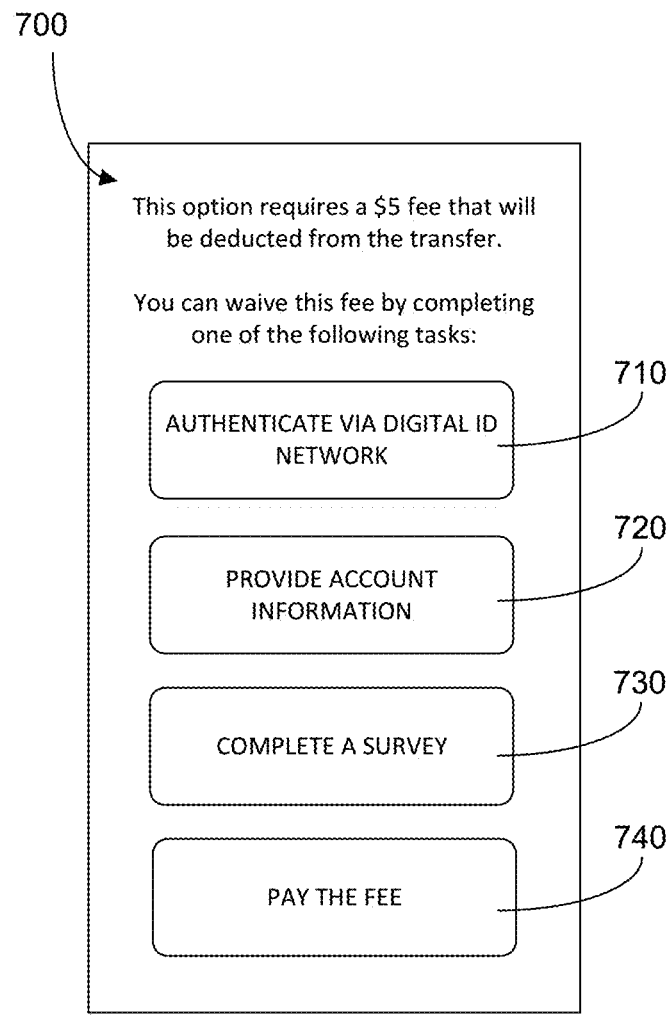
FIG. 7 is an example electronic message according to an embodiment.

As example electronic message 700 is shown in FIG. 7. The electronic message displays information relating to the transfer and the input-output modifier and text informing the user that the input-output modifier may be reduced or eliminated by completing one of the requirements. The electronic message includes a first selectable option 710 defining a first requirement to be completed by the user, a second selectable option 720 defining a second requirement to be completed by the user, a third selectable option 730 defining a third requirement to be completed by the user, and a fourth selectable option 740 defining a fourth requirement to be completed by the user.

In this embodiment, the first requirement that can be completed by the user to reduce or eliminate the input-output modifier includes verifying identity data via a digital identity network. As such, the first selectable option 710 includes text "Authenticate via Digital ID Network" indicating to the user that, should they select the first selectable option 710, they will be required to verify identity data via the digital identity network.

Figure 8:
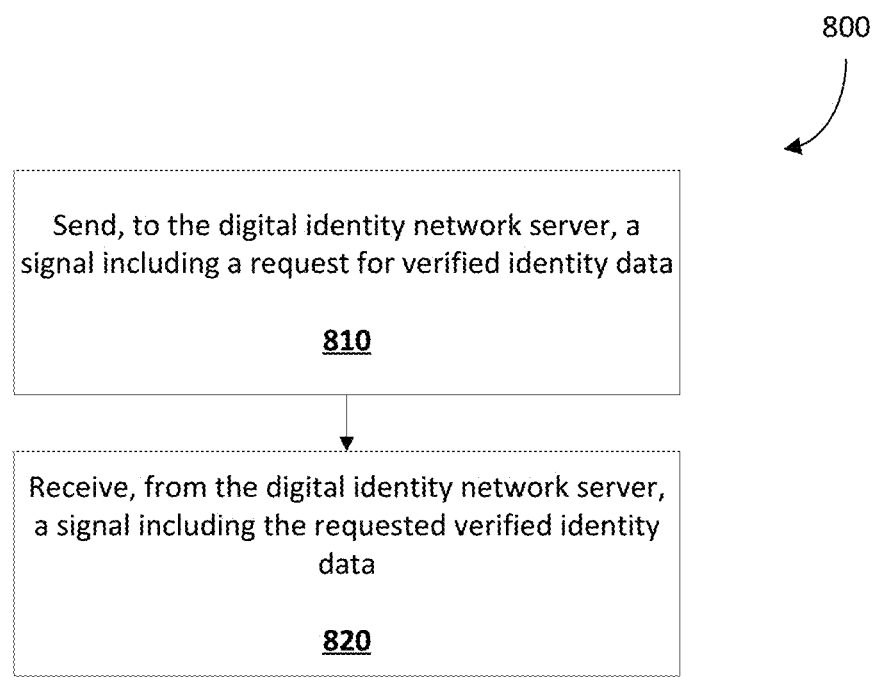
FIG. 8 is flowchart showing operations performed by a server in obtaining verified identity data according to an embodiment.

In response to the user selecting the first selectable option 710, the second computing device 120 sends a signal to the server 130 indicating selection of the first selectable option 710. In response, the server 130 may perform operations to verify identity data via the digital identity network. FIG. 8 is a flowchart showing operations performed by the server 130 in verifying identity data via the digital identity network according to an embodiment. The operations may be included in a method 800 which may be performed by the server 130. For example, computer-executable instructions stored in memory of the server 130 may, when executed by one or more processors, configure the server 130 to perform the method 800 or a portion thereof.

The server 130 sends, via the communications module and to the digital identity network server 140, a signal including a request for verified identity data of the user (step 810). In this embodiment, the request for verified identity data includes identity information of the user. The identity information of the user may include, for example, the transfer address of the user. In another embodiment, in response to the user selecting the first selectable option 710, the server 130 may send a signal to the second computing device 120 that causes the second computing device 120 to display GUI including one or more input fields to be completed by the user to provide identity information. The identity information may include, for example, a first name, a last name, an address, a date of birth, a social security number, a social insurance number, etc.

The request for verified identity data may additionally include a request for account information of the user. The account information may include at least one of a bank account balance, a transaction history, identity information, bank account information or account age data.

In response to receiving the request for verified identity data, the digital identity network server 140 sends a request for verified identity data of the user to the trusted partners within the digital identity network. The request includes the identity information of the user. One of the trusted members of the digital identity network may act as a digital asset provider and thus may provide the requested verified identity data of the user to the digital identity network server 140. The digital asset provider may also provide the account information of the user.

The digital identity network server 140 may provide the requested verified identity data to the server 130. As such, the server 130 acts as a digital asset consumer. The requested verified identity data may be provided through the digital identity network in a blind manner such that the digital asset provider does not know the identity of the digital asset consumer and such that the digital asset consumer does not know the identity of the digital asset provider.

The digital identity network server 140 may send a signal to the second computing device 120 that includes a request to release verified identity data to the server 130. The user may grant permission to release verified identity data to the server 130 by selecting a selectable option included with the request. In response to the user granting permission, the digital identity network server 140 may release the requested verified identity data to the server 130.

The server 130 receives, via the communications module and from the digital identity network server 140, a signal including the requested verified identity data (step 820).

The verified identity data may include information indicating that the identity of the user has been verified or authenticated by the digital asset provider. As such, since the digital asset provider has previously verified the identity of the user, this verified identity data may be used by the server 130 to authenticate the user. As mentioned, the verified identity data may include account information.

The second requirement that can be completed by the user to reduce or eliminate the input-output modifier includes providing account information via an application programming interface. As such, the second selectable option 720 includes text "Provide Account Information" indicating to the user that, should they select the second selectable option 720, they will be required to provide account information via an application programming interface.

Figure 9:
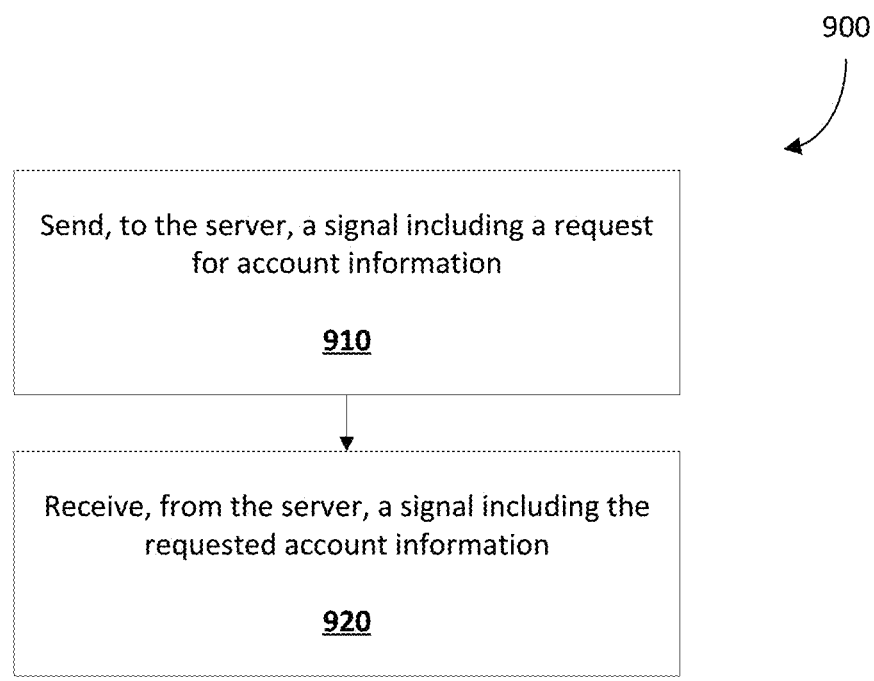
FIG. 9 is flowchart showing operations performed by a server in obtaining account information according to an embodiment.

In response to the user selecting the second selectable option 720, the second computing device 120 sends a signal to the server 130 indicating selection of the second selectable option 720. In response, the server 130 may perform operations to obtain account information of the user. FIG. 9 is a flowchart showing operations performed by the server 130 in obtaining account information according to an embodiment. The operations may be included in a method 900 which may be performed by the server 130. For example, computer-executable instructions stored in memory of the server 130 may, when executed by one or more processors, configure the server 130 to perform the method 900 or a portion thereof.

The server 130 sends, via the communications module and to a server, a signal including a request for account information (step 910). In this embodiment, the server may be the third party server 160 that stores a token allowing the third party server 160 to obtain account information of the server. The signal may include identifying information of the user which may include the transfer address, for example.

The user may be required to provide consent to release the requested account information to the server 130. As such, the third party server 160 may send a signal to the second computing device 120 that includes a request to release the requested account information to the server 130. The user may grant permission to release the account information to the server 130 by selecting a selectable option included with the request. In response to the user granting permission, the third party server 160 may release the requested account information to the server 130.

The server 130 receives, via the communications module and from the server, the requested account information (step 920). The account information may include at least one of a bank account balance, a transaction history, identity information, bank account information or account age data.

The third requirement that can be completed by the user to reduce or eliminate the input-output modifier includes completing a survey. As such, the third selectable option 730 includes text "Complete a Survey" indicating to the user that, should they select the third selectable option 730, they will be required to complete a survey.

In response to the user selecting the third selectable option 730, the second computing device 120 sends a signal to the server 130 indicating selection of the third selectable option 730. In response, the server 130 may send, via the communications module and to the second computing device 120, a signal that includes a survey to be completed by the user. The survey may be displayed, for example, as a webpage within the web browser executing on the second computing device 120. The survey includes one or more questions to be completed by the user. The one or more questions may require the user to provide personal information regarding themselves and/or financial information. The one or more questions may be associated with banking or personal finance and the answers may be useful or otherwise valuable to the financial institution associated with the server 130. The questions may be, for example, related to a mortgage or retirement savings account of the user that may not currently be maintained by the financial institution associated with the server 130. The answers received may be used by the financial institution associated with the server 130 to send or otherwise provide the user with information regarding products offered by the financial institution associated with the server 130. When the user has completed the survey, the second computing device 120 may send a signal to the server 130 indicating that the survey has been completed.

The fourth requirement that can be completed by the user is to apply the input-output modifier to the transfer amount. As such, the fourth selectable option 740 includes text "Pay the Fee" indicating to the user that, should they select the fourth selectable option 740, the input-output modifier will be applied to the transfer amount. In response to the user selecting the fourth selectable option 740, the second computing device 120 sends a signal to the server 130 indicating selection of the fourth selectable option 740.

The server 130 determines that the additional requirement has been completed (step 540).

When the user has selected the first selectable option 710, the server 130 determines that the additional requirement has been completed when the signal including the requested verified identity data has been received.

When the user has selected the second selectable option 720, the server 130 determines that the additional requirement has been completed when the signal including the account information has been received. In some embodiments, the server 130 may only determine that the additional requirement has been completed when the account information of the user satisfies predefined criteria. For example, the account information may include account age data. The server 130 may only determine that the additional requirement has been completed if the age of the account is greater than a threshold. For example, new accounts may not be permitted receive transfers made using the first transfer method.

When the user has selected the third selectable option 730, the server 130 determines that the additional requirement has been completed when the signal indicating that the survey has been completed is received.

When the user has selected the fourth selectable option 740, the server 130 determines that the additional requirement has been completed when the signal indicating the selection of the fourth selectable option 740 has been received.

When it is determined that the additional requirement has been completed, the server 130 completes the transfer using the first transfer method (step 550).

Figure 10:
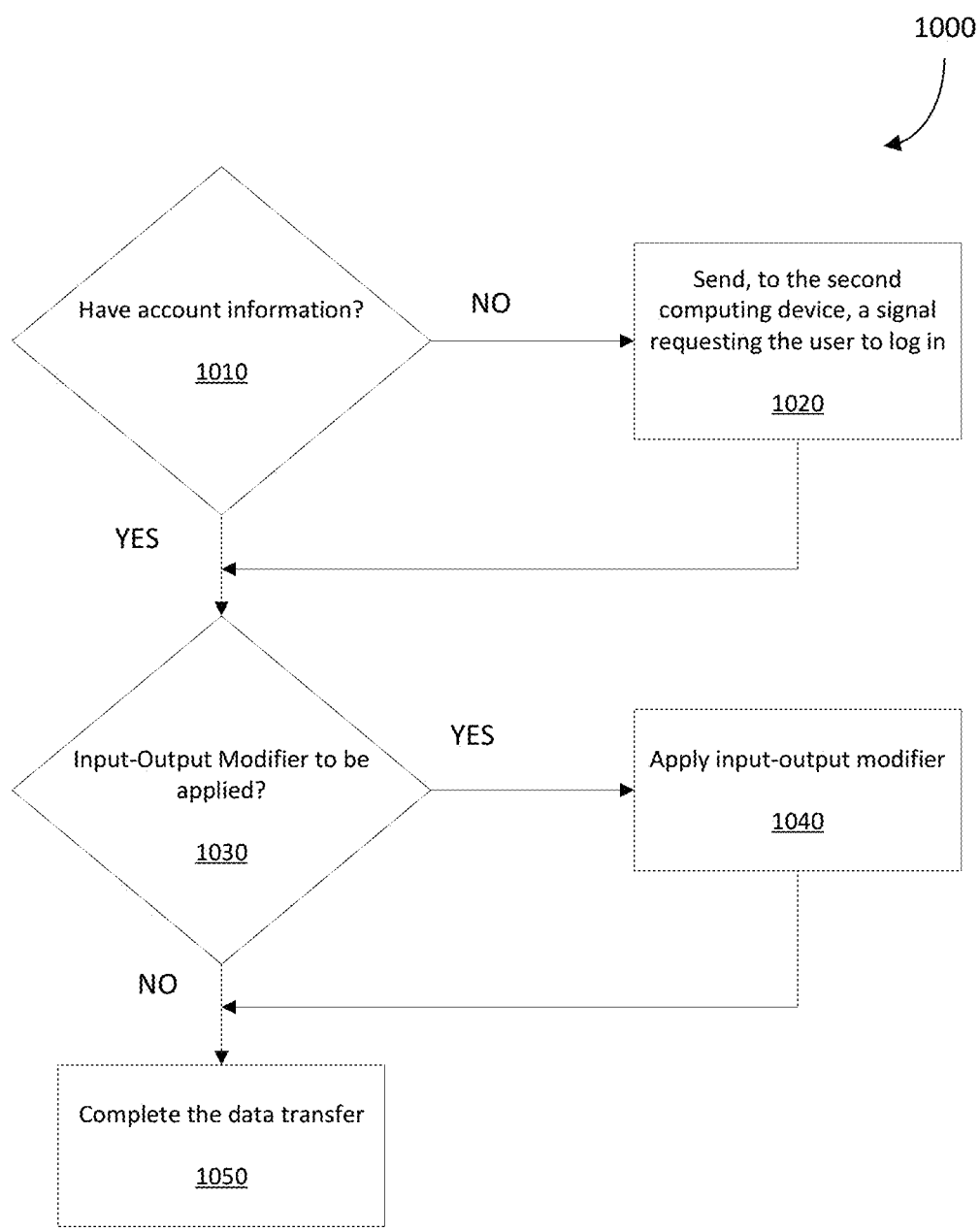
FIG. 10 is a showing operations performed by a server in completing a data transfer according to an embodiment.

FIG. 10 is a flowchart showing operations performed by the server 130 in completing the data transfer using the first transfer method according to an embodiment. The operations may be included in a method 1000 which may be performed by the server 130. For example, computer-executable instructions stored in memory of the server 130 may, when executed by one or more processors, configure the server 130 to perform the method 1000 or a portion thereof.

A check is performed to determine if the server 130 has account information for the account receiving the transfer (step 1010). The server 130 may have received or otherwise obtained the account information during step 530 of method 500. For example, when the user has selected the first selectable option 710 or the second selectable option 720, the server 130 may have received a signal including account information which may include bank account information.

When it is determined that the server 130 does not have account information for the account receiving the transfer, the server 130 sends, via the communications module and to the second computing device 120, a signal that includes a request for the user to log in to their bank account (step 1020). The signal may cause the second computing device 120 to display a GUI that includes one or more selectable options that, when selected, direct the second computing device 120 to a login page of a particular financial institution. In this manner, the user may select their financial institution and the second computing device 120 may be directed to a login page for the user to complete the login and thus provide the server 130 with account information.

Once the server 130 has the required account information, the method continues to determine if an input-output modifier is to be applied (step 1030). The server 130 may determine that the user has completed a requirement to eliminate the input-output modifier and thus may determine that the input-output modifier does not need to be applied.

When it is determined that the input-output modifier is to be applied, the server 130 applies the input-output modifier to the transfer amount (step 1040). The server 130 may determine that the input-output modifier is to be applied based on, for example, the user selecting the fourth selectable option 740. As mentioned, the input-output modifier may be, for example, a set fee or may be a percentage of the transfer amount. Where the input-output modifier is a set fee, the server 130 adjusts the transfer amount by subtracting the set fee from the transfer amount. Where the input-output modifier is a percentage of the transfer amount, the percentage of the amount is calculated and subtracted from the transfer amount. The input-output modifier may be deposited into an account maintained by the server 130. The remainder of the transfer amount may be referred to as the adjusted transfer amount.

As mentioned, completing a requirement may reduce the input-output modifier and as such during step 1040, the server 130 may adjust the input-output modifier based on the completed requirement.

The server 130 then completes the transfer (step 1050). In this embodiment, the server 130 completes the transfer by sending a signal to the real-time transfer rail server, the signal including the transfer amount (or the adjusted transfer amount) and the account information. The real-time transfer server deposits the transfer amount (or the adjusted transfer amount) into the account based on the account information.

In embodiments where a security question and security answer as used, the server 130 may send a signal causing the second computing device 120 to display the security question and may include an input field for the user to enter the security answer. When the correct security answer has been entered by the user, the server 130 may then complete the data transfer.

It will be appreciated that during method 500 the server 130 may receive a signal indicating a selection of the at least one selectable option defining the second transfer method. The server 130 may complete the data transfer by sending a signal to a transfer rail server in a manner similar to that of method 1000.

Although in embodiments first and second transfer methods were provided, it will be appreciated that additional transfer methods may be provided. For example, in another embodiment, a third and a fourth transfer method may be provided.

Although in embodiments the input-output modifier is described as being one of a set fee and a percentage of the transfer amount, it will be appreciated that different input-output modifiers may be used. For example, a first transfer method may be associated with a first input-output modifier, a second transfer method may be associated with a second input-output modifier, and a third transfer method may be associated with no input-output modifier. The first input-output modifier may be a set fee and the second input-output modifier may be a percentage of the transfer amount.

Although in embodiments requirements are presented to the user that, when completed, reduce or eliminate the input-output modifier, those skilled in the art that each requirement may be associated with a different input-output modifier. For example, a first requirement may be completed by the user to reduce the transfer fee by $1, a second requirement may be completed to reduce the transfer fee by $2, and a third requirement may be completed to eliminate the transfer fee. In another embodiment, the user may complete multiple requirements to further reduce the transfer fee. For example, a first requirement may be completed by the user to reduce the transfer fee by $1 and a then a second requirement may be completed by the user to further reduce the transfer fee by $1. As such, by completing two requirements, the transfer fee is reduced by $2.

Although in embodiments the receiver of the transfer is provided with one or more selectable options defining a transfer method, it will be appreciated that the sender may configure the list of selectable options available to the receiver. For example, when initiating the data transfer request, the sender may be presented with an option to select one or more transfer methods to be presented to the receiver. In this manner, the sender may limit the amount of options available to the receiver.

Although in embodiments the input-output modifier is described as being applied to the transfer amount, in another embodiment the sender may agree to pay the input-output modifier once selected by the receiver. For example, when initiating the data transfer request, the sender may be presented with an option to pay the transfer fee for one or more of the transfer methods. When the receiver selects the transfer method and the transfer is completed, the transfer fee may be taken from the senders' account. In another example, the sender may wish to pay the transfer fee for only one of the transfer methods. For example, the sender may agree to pay the transfer fee for a first transfer method but may not agree to pay the transfer fee for a second transfer method. In this example, when the receiver selects the first transfer method the transfer fee may be taken from the senders' account and when the receiver selects the second transfer method the transfer fee may be taken from the transfer amount. In another embodiment, the sender may agree to cover a certain percentage of the transfer fee. In another embodiment, the sender may define a limit as to how much the sender is willing to pay towards the transfer fee. When the receiver selects a transfer method that has a transfer fee greater than the limit, then the difference between the transfer fee and the limit may be taken from the transfer amount.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A server comprising:
a communications module;
a processor coupled with the communications module; and
a memory coupled to the processor and storing processor-executable instructions which, when executed by the processor, configure the processor to:
receive, via the communications module and from a first computing device associated with a sender of a data transfer request, a signal representing the data transfer request, the data transfer request including a transfer amount and a transfer address of a recipient of the data transfer request;
send, via the communications module and to the transfer address of the recipient of the data transfer request, a signal including an electronic message, the electronic message including the transfer amount and at least one selectable option defining a transfer method, the at least one selectable option including a first selectable option defining a first transfer method to complete the data transfer that utilizes a real-time transfer rail and includes an additional requirement not required by a second transfer method that utilizes a non-real-time transfer rail and a second selectable option defining the second transfer method to complete the data transfer, the first selectable option displaying a first transfer time for completing the first transfer method and the second selectable option displaying a second transfer time for completing the second transfer method, the first transfer time less than the second transfer time;
receive, via the communications module and from a second computing device that has retrieved the electronic message and is associated with the recipient of the data transfer request, a signal indicating a selection of the first selectable option defining the first transfer method to complete the data transfer that utilizes the real-time transfer rail;
send, via the communications module and to the second computing device, a signal that causes the second computing device to display a graphical user interface that includes one or more selectable options that, when selected, directs the second computing device to a login page associated with a third party server;
receive, via the communications module and from the second computing device, a signal indication a selection of one of the selectable options;
send, via the communications module and to the second computing device, a signal directing the second computing device to the login page associated with the third party server;
obtain account information from the third party server in response to the second computing device completing the login;
determine that the additional requirement has been completed; and
when it is determined that the additional requirement has been completed, complete the data transfer using the first transfer method by sending a signal to a real-time transfer rail server that includes the transfer amount and the account information to complete the data transfer in real-time.

2. The server of claim 1, wherein the first transfer method requires an input-output modifier for completing the transfer using the first transfer method and wherein the additional requirement, when completed, eliminates or reduces the input-output modifier for completing the transfer using the first transfer method.

3. The server of claim 1, wherein the additional requirement includes at least one of:
an input-output modifier;
completion of a survey;
providing the account information via an application programming interface (API); or
verifying identity data via a digital identity network.

4. The server of claim 3, wherein the additional requirement includes the input-output modifier and completing the transfer using the first transfer method includes applying the input-output modifier to the transfer amount.

5. The server of claim 3, wherein the additional requirement includes verifying identity data via the digital identity network and the processor-executable instructions, when executed by the processor, further configure the processor to:
receive, via the communication module and from the digital identity network, a signal including the requested identity data in a blind manner such that the server does not know an identity of a provider of the requested identity data.

6. The server of claim 5, wherein the requested identity data includes the account information.

7. The server of claim 3, wherein the additional requirement includes providing the account information via the API and the processor-executable instructions, when executed by the processor, further configure the processor to:
receive, via the communications module and from the third party server, a signal including the account information.

8. The server of claim 7, wherein the account information includes at least one of a bank account balance, a transaction history, identity information, bank account information or account age data.

9. The server of claim 3, wherein the additional requirement includes completion of the survey and wherein determining that the additional requirement has been completed includes receiving, via the communications module, a signal indicating that the survey has been completed.

10. A computer-implemented method comprising:
receiving, via a communications module and from a first computing device associated with a sender of a data transfer request, a signal representing the data transfer request, the data transfer request including a transfer amount and a transfer address of a recipient of the data transfer request;
sending, via the communications module and to the transfer address of the recipient of the data transfer request, a signal including an electronic message, the electronic message including the transfer amount and at least one selectable option defining a transfer method, the at least one selectable option including a first selectable option defining a first transfer method to complete the data transfer that utilizes a real-time transfer rail and includes an additional requirement not required by a second transfer method that utilizes a non-real-time transfer rail and a second selectable option defining the second transfer method to complete the data transfer, the first selectable option displaying a first transfer time for completing the first transfer method and the second selectable option displaying a second transfer time for completing the second transfer method, the first transfer time less than the second transfer time;

receiving, via the communications module and from a second computing device that has retrieved the electronic message and is associated with the recipient of the data transfer request, a signal indicating a selection of the first selectable option defining the first transfer method to complete the data transfer that utilizes the real-time transfer rail;

sending, via the communications module and to the second computing device, a signal that causes the second computing device to display a graphical user interface that includes one or more selectable options that, when selected, directs the second computing device to a login page associated with a third party server;

receiving, via the communications module and from the second computing device, a signal indication a selection of one of the selectable options;

sending, via the communications module and to the second computing device, a signal directing the second computing device to the login page associated with the third party server;

obtaining account information from the third party server in response to the second computing device completing the login;

determining that the additional requirement has been completed; and when it is determined that the additional requirement has been completed, completing the transfer using the first transfer method by sending a signal to a real-time transfer rail server that includes the transfer amount and the account information to complete the data transfer in real-time.

11. The computer-implemented method of claim 10, wherein the first transfer method requires an input-output modifier for completing the transfer using the first transfer method and wherein the additional requirement, when completed, eliminates or reduces the input-output modifier for completing the transfer using the first transfer method.

12. The computer-implemented method of claim 10, wherein the additional requirement includes at least one of:
an input-output modifier;
completion of a survey;
providing the account information via an application programming interface (API); or
verifying identity data via a digital identity network.

13. The computer-implemented method of claim 12, wherein the additional requirement includes the input-output modifier and completing the transfer using the first transfer method includes applying the input-output modifier to the transfer amount.

14. The computer-implemented method of claim 12, wherein the additional requirement includes verifying identity data via the digital identity network and the method further comprises:
receiving, via the communication module and from the digital identity network, a signal including the requested identity data in a blind manner such that the identity of a provider of the requested identity data is unknown.

15. The computer-implemented method of claim 12, wherein the additional requirement includes providing the account information via the API and the method further comprises:

receiving, via the communications module and from the third party server, a signal including the account information.

16. The computer-implemented method of claim 15, wherein the account information includes at least one of a bank account balance, a transaction history, identity information, bank account information or account age data.

17. A non-transitory computer readable storage medium comprising computer-executable instructions which, when executed, configure a processor to:
receive, via a communications module and from a first computing device associated with a sender of a data transfer request, a signal representing the data transfer request, the data transfer request including a transfer amount and a transfer address of a recipient of the data transfer request;

send, via the communications module and to the transfer address of the recipient of the data transfer request, a signal including an electronic message, the electronic message including the transfer amount and at least one selectable option defining a transfer method, the at least one selectable option including a first selectable option defining a first transfer method to complete the data transfer that utilizes a real-time transfer rail and includes an additional requirement not required by a second transfer method that utilizes a non-real-time transfer rail and a second selectable option defining the second transfer method to complete the data transfer, the first selectable option displaying a first transfer time for completing the first transfer method and the second selectable option displaying a second transfer time for completing the second transfer method, the first transfer time less than the second transfer time;

receive, via the communications module and from a second computing device that has retrieved the electronic message and is associated with the recipient of the data transfer request, a signal indicating a selection of the at first selectable option defining the first transfer method to complete the data transfer that utilizes the real-time transfer rail;

send, via the communications module and to the second computing device, a signal that causes the second computing device to display a graphical user interface that includes one or more selectable options that, when selected, directs the second computing device to a login page associated with a third party server;

receive, via the communications module and from the second computing device, a signal indication a selection of one of the selectable options;

send, via the communications module and to the second computing device, a signal directing the second computing device to the login page associated with the third party server;

obtain account information from the third party server in response to the second computing device completing the login;

determine that the additional requirement has been completed; and when it is determined that the additional requirement has been completed, complete the data transfer using the first transfer method by sending a signal to a real-time transfer rail server that includes the transfer amount and the account information to complete the data transfer in real-time.

18. The server of claim 1, wherein the additional requirement includes granting permission to a digital asset provider to release account information previously authenticated by the digital asset provider and the processor-executable instructions, when executed by the processor, further configure the processor to:
  receive a signal that includes the account information previously authenticated by the digital asset provider.

* * * * *